July 5, 1955  J. HADFIELD  2,712,479
PIVOT CONNECTION FOR ARTICULATED VEHICLES
Filed May 16, 1952  3 Sheets-Sheet 1

Inventor:
James Hadfield,
by Pierce, Scheffler + Parker,
Attorneys.

July 5, 1955   J. HADFIELD   2,712,479
PIVOT CONNECTION FOR ARTICULATED VEHICLES
Filed May 16, 1952   3 Sheets-Sheet 2

Inventor:
James Hadfield,
by Pierce, Scheffler & Parker,
Attorneys.

July 5, 1955 J. HADFIELD 2,712,479
PIVOT CONNECTION FOR ARTICULATED VEHICLES
Filed May 16, 1952 3 Sheets-Sheet 3

Inventor:
James Hadfield,
by Pierce, Scheffler & Parker,
Attorneys.

United States Patent Office 2,712,479
Patented July 5, 1955

2,712,479

PIVOT CONNECTION FOR ARTICULATED VEHICLES

James Hadfield, Romiley, Chester, England, assignor to Beyer Peacock & Company Limited, Gorton, England, a British company Application May 16, 1952, Serial No. 288,250

5 Claims. (Cl. 308—137)

This invention relates to pivot connections for articulated vehicles, such as articulated locomotives.

The primary object of the invention is the provision of an improved pivot connection of this character, in which means are provided whereby the wear between the male and female members will be taken up automatically, and, at the same time shocks and excessive thrusts set up between said members will be prevented from causing damage either to the members themselves or to the framework of the vehicle.

Another object is the provision of a pivot connection of the said character in which the assembly of the male and female members will be much facilitated.

Other objects and advantages will appear hereinafter.

Figures 1, 4:
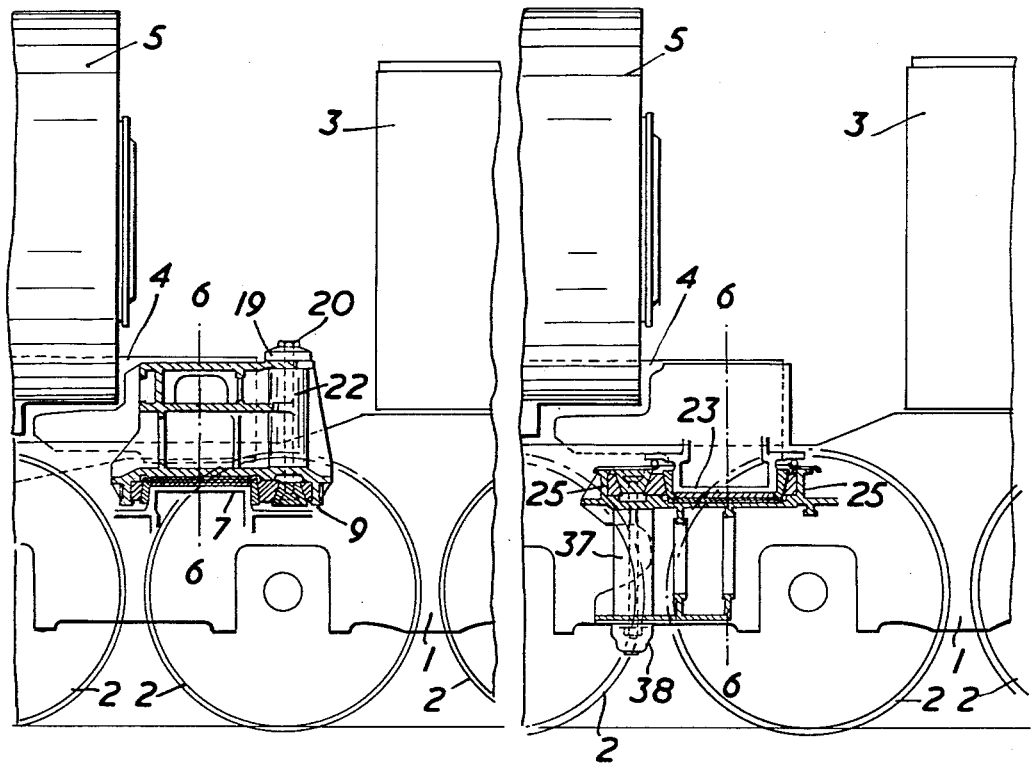
Figure 2:
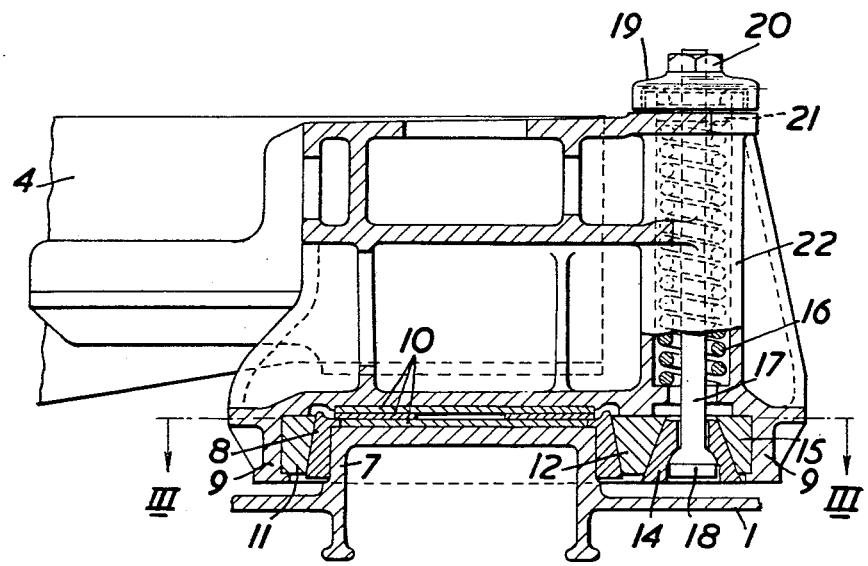
Figure 3:
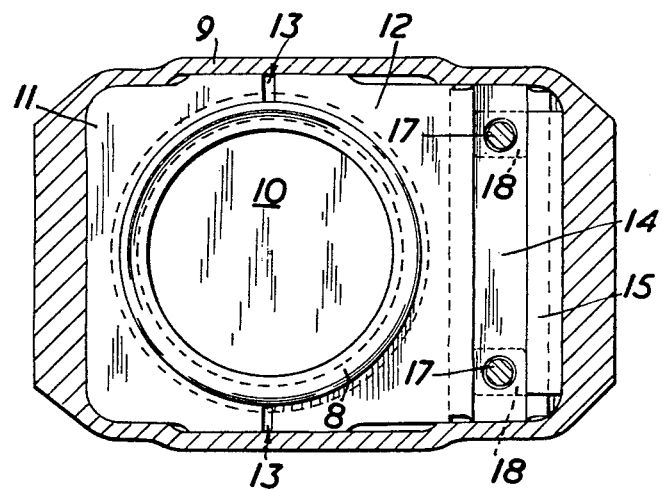
Figure 5:
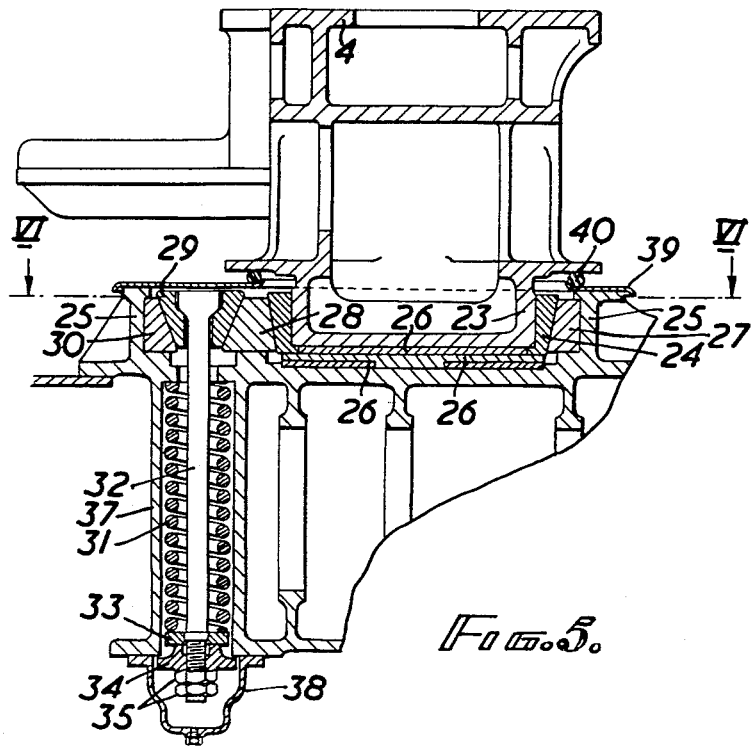
Figure 6:
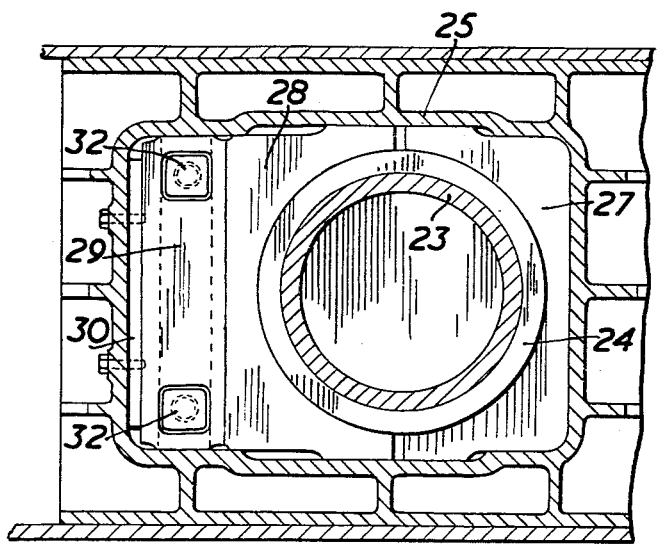

In order that the invention may be the more clearly understood two pivot connections in accordance with the invention will now be described, reference being made to the accompanying drawings, wherein:

Figure 1 is a sectional elevation of one of asid pivot connections, shown incorporated in an articulated locomotive, Figure 2 is similar view to a larger scale of the pivot connection alone, Figure 3 is a section on line III—III of Figure 2, Figure 4 is a similar view to Figure 1 of the other pivot connection, Figure 5 is a similar view to Figure 2 showing the pivot connection of Figure 4 alone, Figure 6 is a section on line VI—VI of Figure 5.

Referring to the drawings the type of vehicle to which the pivot connections are applied is an articulated locomotive. This consists otf two power units which run on the railway track, and a boiler unit supported between them by pivot connections at each end so as to be capable of pivoting about a vertical axis relative to each power unit. Articulated locomotives of this type are quite well known in themselves. Each power unit consists of a chassis 1 mounted on track wheels 2, and said chassis carries, in addition to a water or fuel tank 3, a pair of cylinders (not shown) which drive at least some of the track wheels 2. The boiler unit consists of a chassis 4 on which is mounted a steam boiler 5 from which the cylinders of the power units are supplied. The chassis 4 of the boiler unit does not have any track wheels. At its two ends it overhangs the chassis 1 of the power units, and it is pivotally supported on each of said chassis 1 through a pivot connection so as to be capable of pivoting relative to such chassis 1 about an axis 6—6. In Figures 1 and 4 only one end of one of the power units and the adjacent end of the boiler unit is shown.

Referring now to Figures 1, 2 and 3 which illustrate a pivot connection of the upright type, the chassis 1 incorporates an upright cylindrical support 7 which forms the core of the male member of the pivot connection. The circumferential wearing part 8 of said male member is mounted on this support 7. The chassis 4 of the boiler unit is formed with an inverted box like enclosure 9 which forms a casing for the female member of the pivot centre and associated adjusting parts. The inverted bottom of said enclosure 9 rests flush on the top of said male members 7, 8 with wearing discs 10 in between. Said female member consists of two parts 11 and 12. The part 11 consists of a thick plate or block with a nearly semi-circular recess cut out of one edge thereof. This recess fits around the part 8 of the male member, and said part 11 as a whole fits in the enclosure 9 so that said part 11 is restrained against horizontal movement relative to the chassis 4.

The part 12 of said female member also consists of a thick plate or block with a nearly semi-circular recess cut out of one edge thereof. This recess fits round the part 8 of the male member on the side opposite to the part 11, a gap 13 being left between said parts 11 and 12 as shown. Said part 12 fits in the enclosure 9 so as to be incapable of any horizontal movement relative to said enclosure except movement directly away from the male member or towards said male member for making up wear.

The maintaining said part 12 up against the part 8 of the male member and automatically feeding it towards said male member for taking up wear, the edge face of said part 12 remote from the male member is inclined to the vertical downwardly and a wedge 14 is provided having a face which engages said inclined face of said part 12 and is of course inclined to the vertical upwardly in a complementary manner. The face of said wedge 14 remote from the part 12 is also inclined to the vertical upwardly, and a reaction member 15 is provided having a face which engages the last named face of the wedge 14 and is itself inclined to the vertical downwardly in a complementary manner. The face of the reaction member 15 remote from the wedge 14 is vertical and abuts flush against the vertical end wall of the box like enclosure 9. As clearly shown the box like enclosure is formed to positively prevent any upward movement of either of the parts 11 and 12 of the female member or of the reaction member 15.

The wedge 14 is permanently biased upwards by means of springs 16 acting through pull rods 17, and thus, as wear takes place between the part 8 of the male member on the one hand and the parts 11 and 12 of the female member on the other, said part 12 will be moved towards said part 11 and the wear will be taken up. It will be seen that, as the wedge 14 has inclined surfaces on both sides engaging, respectively with complementary inclined surfaces of the reaction member 15 and the part 12, the total movement of the part 12 for a given lift of said wedge will be the sum of two component movements, one a horizontal component of movement of the wedge itself relative to the reaction member 15, and the other a horizontal component of movement of said member 12 relative to the wedge.

In the present arrangement, owing both to the fact that the movement of the part 12 for a given lift of the wedge is thus doubled due to a wedge action taking place on both sides of the wedge, and also to the fact that the angle of inclination to the vertical of both sides of the wedge is made relatively large, the action of the wedge is made reversible. That is to say, horizontal thrust of sufficient magnitude exerted on the part 12 in the direction away from the part 11 will overcome the frictional resistance to relative sliding movement of the cooperating wedge surfaces and cause said part 12 actually to move away from said part 11 thereby forcing the wedge down in opposition to the pull exerted by the springs 16 through the pull rods 17.

This feature is of the greatest importance. If, for example, excessive tilting movement should take place between the male and female members, as might happen in the case of a derailment of the articulated locomotive or when negotiating curve track, which tilting might cause binding between the male and female members, the fact that the part 12 of the female member is free to withdraw would relieve the supporting structure of excessive strains which would otherwise result.

Again, should "snatch" occur at the drawbar by which the articulated locomotive is coupled to a train, this would throw a horizontal thrust on each pivot connection of the articulated locomotive, and the freedom of the part 12 to withdraw slightly would cushion the shock.

Again, as in copending application Serial No. 187,891, filed Oct. 2, 1950 as a continuation-in-part of my earlier application Ser. No. 783,991, now abandoned, the part 8 of the male member has a conical outer surface and the parts 11 and 12 of the female member have corresponding conical inner surfaces. This leads to another important advantage of making the action of the wedge 14 reversible. Thus, it will be appreciated that, when the male and female members of the pivot are separated, the part 12 of the female member will move towards the part 11 under the influence of the springs 15 up to a limit determined by the gap 13 or by some other stop on the upward movement of the wedge 14. Owing however to the conical nature of said male and female members, the part 8 of the male member can always be inserted between the parts 11 and 12 of the female member even when the latter are closed together as far as possible, and thus when said male and female members are to be assembled, all that is necessary is to insert said part 8 between said parts 11 and 12. The load pressing the female member down on the male member will then, owing to the conicity of said parts 8, 11 and 12, set up a horizontal component of thrust acting on the part 12 sufficient to move it away from the part 11 and cause the wedge to "back out" to the extent necessary to permit of complete assembly. Thus the assembly does not involve any slackening of the springs or any manipulation of the wedge and the part 12, but merely requires a lowering of the female member on to the male member.

In construction, the rods 17 are formed with hemispherical heads 18 at their lower ends, and said rods pass upwards through holes in the wedge 14, the heads 18 seating in counter-sunk enlargements at the lower ends of said holes. At their upper ends the rods 17 are screw threaded, and each one has a cover nut 19 screwed on it and held by means of lock nuts 20. The springs 16 are coiled on the rods, and each one is in compression between a washer 21 beneath said cover nut at its upper end and a fixed part of the structure of the chassis 4 at its lower end as clearly shown. Thus the wedge 14 is biased upwards as stated.

The cover nut 19 is just above a fixed part of the structure of the chassis 4 and thus, should a spring break, the wedge can be raised to the appropriate position by screwing down the nut 19 and thereby pressing said cover nut 19 against said fixed part.

The springs are each protected by being housed in a cylindrical casing 22 forming part of the chassis structure.

Turning now to Figures 4, 5 and 6, the only substantial difference between the pivot connection of these figures and that of Figures 1, 2 and 3 is that that of Figures 1, 2 and 3 is of the upright type with the male member pointing upwards and the wedge biased upwards, that of Figures 4, 5 and 6 is inverted having the male member pointing downwards and the wedge biased downwards. Thus briefly describing Figures 4, 5 and 6, the cylindrical support 23 which forms the core of the male member is incorporated with the chassis 4 of the boiler unit. The circumferential wearing part of said male member is designated by the reference 24. The box like enclosure for the female member and associated parts, which is designated by the reference 25, is now incorporated with the chassis 1 of the power unit and is upright instead of inverted. The wearing discs between the bottom of this enclosure and the male member are designated by the reference 26.

The references 27, 28, 29, 30, 31 and 32 designate respectively the two parts of the female member, the wedge, the reaction member, the springs and the pull rods. These parts function exactly as in the construction of Figures 1 to 3 except that the pull rods 32 extend downwards from the wedge 29 and pull said wedge downwards, and that the inclined surfaces of said wedge and of the parts 28 and 30 are accordingly of reversed inclination.

In the present case each of the springs 31 bears at its upper end against a fixed part of the structure, and at its lower end against a washer 33 supported by a nut element 34 screwed on the pull rod 32 and secured in place by lock nuts 35. As in the preceding embodiment each spring 31 is housed in a cylindrical casing 37. The lower ends of the casings are closed by fixed covers 38.

The references 39 and 40 designate a cover member and gasket for covering the box like enclosure 25 and keeping dust and other foreign bodies from the parts therein.

I claim:

1. A pivot connection for articulated vehicles, comprising a male member, a female member including two parts each partially embracing said male member, a wedge movable for adjusting one of said parts by wedge action and thereby causing it to take up wear, and spring means biasing said wedge in the direction for taking up wear whereby wear is taken up automatically, the inclination of said wedge being in excess of the critical value at which the movement of the wedge is reversible, whereby a sufficient thrust applied to said one part in the direction opposite to that for taking up wear will cause said one part to move and thereby force withdrawal of said wedge in opposition to said spring means.

2. A pivot connection for articulated vehicles, comprising a male member, a female member including two parts each partially embracing said male member, a reaction element, a wedge located between said reaction element and one of said parts and movable for adjusting said one part and thereby causing the latter to take up wear, the two surfaces of said wedge which engage surfaces of said one part and of said reaction member being both inclined in opposite directions with respect to a plane at right angles to the direction of movement of said one part, and said surfaces of said one part and of said reaction element being inclined in complementary manner, whereby the movement of said one part in response to movement of said wedge is the sum of two component movements due to the wedge action on the two sides of said wedge and spring means biasing said wedge in the direction for taking up wear whereby wear is taken up automatically, the inclination of said wedge being in excess of the critical value at which the movement of the wedge is reversible, whereby a sufficient thrust applied to said one part in the direction opposite to that for taking up wear will cause said one part to move and thereby force withdrawal of said wedge in opposition to said spring means.

3. A pivot connection for articulated vehicles comprising a male member with a vertical axis, a female member including two parts each partially embracing said male member, a wedge movable in a direction longitudinally of said axis for adjusting one of said parts by wedge action and thereby causing it to take up wear, and spring means biasing said wedge in the direction for taking up wear whereby wear is taken up automatically, the inclination of said wedge being in excess of the critical value at which the movement of the wedge is reversible, whereby, a sufficient thrust applied to said one part in the direction opposite to that for taking up wear will cause said one part to move and thereby force withdrawal of said wedge in opposition to said spring means.

4. A pivot connection for articulated vehicles comprising a male member with a vertical axis, a female member including two parts each partially embracing said male member, a reaction element, a wedge located between said reaction element and one of said parts and movable in a direction longitudinally of said axis for adjusting said one part by wedge action and thereby causing it to take up wear, the two surfaces of said wedge which engage surfaces of said one part and of said reaction member being both inclined to the vertical in opposite directions, and said surfaces of said one part and of said reaction member being inclined in complementary manner, whereby the movement of said one part in response to the movement of said wedge is the sum of two component movements due to the wedge action on the two sides of said wedge, and spring means biasing said wedge in the direction for taking up wear, whereby wear is taken up automatically, the inclination of said wedge being in excess of the critical value at which the movement of the wedge is reversible, whereby, a sufficient thrust applied to said one part in the direction opposite to that for taking up wear will cause said one part to move and thereby force withdrawal of said wedge in opposition to said spring means.

5. A pivot connection for articulated vehicles comprising a male member with a vertical axis, a female member including two parts each partially embracing said male member, said male member being tapered towards its extremity and the cavity of said female member being correspondingly tapered, a reaction element, a wedge located between said reaction element and one of said parts and movable in a direction longitudinally of said axis for adjusting said one part by wedge action and thereby causing it to take up wear, the two surfaces of said wedge which engage surfaces of said one part and of said reaction member being both inclined to the vertical in opposite directions, and said surfaces of said one part and of said reaction member being inclined in complementary manner, whereby the movement of said one part in response to the movement of said wedge is the sum of two component movements due to the wedge action on the two sides of said wedge, and spring means biasing said wedge in the direction for taking up wear whereby wear is taken up automatically, the inclination of said wedge being in excess of the critical value at which the movement of the wedge is reversible, whereby a sufficient thrust applied to said one part in the direction opposite to that for taking up wear will cause said one part to move and thereby force withdrawal of said wedge in opposition to said spring means, whereby the male and female members can be fully assembled by simply forcing the male member into the female member.

References Cited in the file of this patent

UNITED STATES PATENTS

| 1,663,582 | Bonney | Mar. 27, 1928 |

FOREIGN PATENTS

| 164,140 | Austria | Oct. 10, 1949 |